United States Patent
Melton et al.

(10) Patent No.: US 6,989,095 B2
(45) Date of Patent: Jan. 24, 2006

(54) FLUID CONDITIONER FOR REDUCING SCALE, CORROSION AND PARAFFIN BUILDUP IN HYDROCARBON PIPING

(75) Inventors: Linda K. Melton, Kilgore, TX (US); Katherine A. Majors, Kilgore, TX (US)

(73) Assignee: Corrosion Inhibitor Systems, LLC, Sulphur, LA (US)

( * ) Notice: Subject to any disclaimer, the term of this patent is extended or adjusted under 35 U.S.C. 154(b) by 0 days.

(21) Appl. No.: 10/891,963

(22) Filed: Jul. 15, 2004

(65) Prior Publication Data

US 2005/0040112 A1   Feb. 24, 2005

Related U.S. Application Data

(62) Division of application No. 10/290,701, filed on Nov. 8, 2002, now abandoned.

(60) Provisional application No. 60/337,495, filed on Nov. 7, 2001.

(51) Int. Cl.
*C02F 5/00*    (2006.01)
(52) U.S. Cl. ............... 210/198.1; 166/902; 204/196.1; 204/248; 210/205
(58) Field of Classification Search ............. 166/244.1, 166/268, 369, 902; 204/248, 293, 196.1; 205/704, 706; 210/696, 192, 198.1, 205, 210/209, 435, 444, 448, 450, 451, 455, 459, 210/460, 462
See application file for complete search history.

(56) References Cited

U.S. PATENT DOCUMENTS

| | | | |
|---|---|---|---|
| 851,159 A | 4/1907 | Case | |
| 1,608,709 A | 11/1926 | Mills | |
| 3,448,034 A | 6/1969 | Craft et al. | 204/197 |
| 3,486,999 A * | 12/1969 | Craft | 204/197 |
| 4,610,783 A * | 9/1986 | Hudson | 210/169 |
| 4,789,031 A | 12/1988 | Walker | 166/369 |
| 4,820,422 A | 4/1989 | Spencer | 210/696 |
| 5,103,914 A | 4/1992 | LaHaye | 166/310 |
| 5,279,732 A * | 1/1994 | Edens | 210/232 |
| 5,368,705 A | 11/1994 | Cassidy | 204/136 |
| 5,453,188 A | 9/1995 | Florescu et al. | 210/222 |
| 5,470,462 A | 11/1995 | Gauger | 210/198.1 |
| 5,485,883 A | 1/1996 | Rippetoe et al. | 166/369 |
| 5,552,057 A * | 9/1996 | Hughes et al. | 210/668 |
| 5,624,559 A * | 4/1997 | Levin et al. | 210/447 |
| 5,665,221 A | 9/1997 | Owen | 205/695 |
| 5,814,227 A * | 9/1998 | Pavlis | 210/696 |
| 6,267,883 B1 | 7/2001 | Weaver et al. | 210/198.1 |
| D446,797 S | 8/2001 | Melton et al. | D15/199 |
| D473,925 S | 4/2003 | Melton et al. | D23/209 |

OTHER PUBLICATIONS

CIS Sales Pamphlet—Published Nov. 12, 2000.
Da-Gator Sales Pamphlet—Published Jul. 1999.
Emissions Panther Sales Material—Published at varying times believed to be as early as 1995 and perhaps as early as 1988.

* cited by examiner

*Primary Examiner*—Peter A. Hruskoci
(74) *Attorney, Agent, or Firm*—C. W. Alworth

(57) ABSTRACT

A device utilizing a catalytic alloy, preferably the Walker Alloy, to reduced scale and paraffin buildup in surface hydrocarbon piping is disclosed. The device is presented in a basket filter configuration for ready servicing. A series of alternate embodiments for the fundamental filter device is discussed.

5 Claims, 10 Drawing Sheets

FLUID CONDITIONER FOR REDUCING SCALE, CORROSION AND PARAFFIN BUILDUP IN HYDROCARBON PIPING

This invention claims the benefit of U.S. Provisional Patent Application No. 60/337,495, filed on Nov. 7, 2001 and is a divisional application of U.S. patent application Ser. No. 10/290,701 filed on Nov. 8, 2002 abandoned.

This invention relates to oil and gas and process industries in particular to an apparatus and method for reducing scale and waxy buildup in oil and gas production piping.

BACKGROUND OF THE INVENTION

Hydrocarbons are produced from a wellbore. The wellbore generally consists of a casing system and a production string. The term casing system is used because, during the drilling of the wellbore, a series of concentric casing runs will be used in the wellbore. For example, a wellbore may consist of surface casing, intermediate casing and final casing. The surface casing, as the name implies, is set near the surface and is used to avoid contamination with surface water sands and to ensure circulation within the wellbore during the initial drilling process. Intermediate casing is set after a certain point in the wellbore and is designed to keep the wellbore open while the drilling operation continues to the pay zone.

After the wellbore reaches the pay zone (formation where commercial quantities of hydrocarbon may be produced) the final casing will be set. In all cases the casing extends from the surface to the "end" of the casing. The well is now cleaned and is ready to be produced. Piping and valves that are directly connected to the final casing will be installed at the surface, and a "production string" will be installed. The production string terminates in valves at the surface and passes into flow lines (production piping) and onto the remainder of the gathering system. Thus, between the pay zone and the surface, there will be two "pipes", the production tubing and the "final" casing: the area between the inside of the casing and the production tubing is called the annulus.

Produced hydrocarbons generally flow only through the production string that is in contact through perforations in the casing with the pay zone. (There are some circumstances in gas wells where gas is produced through the annulus.)

Raw hydrocarbons (crude oil and natural gas) are not a refined product and contain many impurities that are removed during the refining process. Generally these impurities will cause buildup and corrosion all piping that come in contact with the unrefined (crude) hydrocarbon fluid. (There are exceptions where a crude fluid is well behaved and causes few problems in production piping.)

Corrosion and buildup will take place in the production tubing, the surface flow lines and the gathering system. Buildup can be scale (precipitates of minerals found in crude) and paraffin (a natural element found in crude). Corrosion finally causes failure of the piping system, often with disastrous effects; whereas, buildup slowly reduces the production. The industry controls these problems using various methods.

In the case of corrosion, chemical inhibitors are injected into production piping at the surface. This does little to help the production tubing, but the tubing may be replaced when necessary.

In the case of scale and paraffin, chemical inhibitors are injected into production tubing at the surface, but again the production tubing is not protected. Paraffin buildup can be removed by hot-oil washing the affected piping, including the production tubing.

Hot oil washing or treatment causes disruption of production and is expensive. Like hot oil washing, chemical inhibitors are expensive. Thus, there remains a need to reduce or eliminate corrosion and buildup in hydrocarbon piping.

The prior art shows a number of devices and/or systems where fluids are passed over a metal alloy or passed over a metal at some electric potential. The art shows that some reduction in scale and corrosion occurs. One of the early patent that recognized the potential for metal alloys to clean (or stabilize) produced fluids may be found in the disclosures of Mills, U.S. Pat. No. 1,608,709 and Craft et al., U.S. Pat. No. 3,448,034. Walker, U.S. Pat. No. 4,789,031, and Rippetoe et al., U.S. Pat. No. 5,485,833 disclose the use of a metal alloy to reduce buildup and reference other prior art using metals and metal alloys. These devices reduce the effects of buildup and corrosion, but require that the device be installed at the bottom of or in the production string. See also the design patent of the inventors D446,797 (Melton et al.) that discloses a unique design to maximize contact between the produced fluid and a metal alloy.

Installation of the Mills, Craft, Walker, Rippetoe and Melton et al. devices requires removal and reinstallation of the production string or installation of the device from the beginning. Pulling a production string is an expensive process and is often not economic in a marginal or stripper well. After the passage of time, the actual alloy tends to cake over and the effectiveness of the alloy is reduced, requiring that the alloy be cleaned. Thus, an economic method and device for reducing buildup and corrosion in surface piping is required that is readily maintained and assures turbulent flow over the alloy.

In a similar manner, surface piping for water may experience corrosion and scaling. It is known that metal alloys and in particular the Walker Alloy will reduce scale and corrosion. In fact Case, U.S. Pat. No. 851,159 recognized the use of metal compounds for removing Boiler-Scale. A product utilizing the Walker/Craft alloy was sold in the United States as early as 1993 under the trade name "Emissions Panther Water Stabilizer" for use with water. Other products were offered in early 1999 under the brand name "Da-Gator" for use with water. In fact, a Federal Mark (s/n 75/751870) claiming use in commerce on Jul. 2, 1999 was filed for on Jul. 14, 1999; however, the application was abandoned. See also Weaver et al. U.S. 6,267,883, which is based on the Walker Alloy and the Panther Product and is identical to the Da-Gator and the Panther Products.

Spencer, U.S. Pat. No. 4,820,422, discloses a surface unit for countering scale formation in fluid conduits utilizing a metal alloy. The disclosure uses a series of alloy balls within a container and specifies that the device may be used in oil and gas production piping and in water piping. Spencer points out that an alloy rod has been used in the past but that the rod coated and lost its effectiveness. The ball arrangement supposedly causes the balls to rub against each other and help keep the balls clean.

As Spencer states, after the passage of time, the actual alloy tends to cake over and the effectiveness of the alloy is reduced. Spencer attempts to rectify the problem; however, the other devices make no attempt to "self-clean" the alloy. In fact, it is known that the alloy must be taken out-of-service and physically cleaned in order to maintain the efficiency and efficacy of the alloy.

None of the above devices are suitable for use in industrial conditions, nor do the devices assure turbulent mixing of the fluid passing through the device. (Spencer states that pressure drop is deliberately reduced.) Thus, there remains a need for an industrial fluid device that assures turbulent flow over the alloy and is easily maintained. Further, the device must meet certain safety standards (when used in critical flow conditions) and be relatively easy to manufacture.

BRIEF DESCRIPTION OF THE INVENTION

A readily parted device, that induces turbulent flow, is used so that the alloy may be serviced. It has been found that after a period of time precipitates attached to the alloy and reduce the effectiveness. Thus, preventive maintenance requires that the alloy basket and insert be cleaned.

The invention consists of a basket filter designed to be placed in the flow piping of a wellhead, water injection system, or recirculating process. The basket filter contains a basket liner and an insert containing the same alloy described in the Walker U.S. Pat. No. 4,789,031 patent. The design of the basket and insert is such that fluid is forced through the basket and insert in turbulent flow coming into general contact with the alloy. In contacting the alloy the electrostatic potential of the fluid is modified. The modification thereby causes solid minerals and certain hydrocarbons to be better suspended within the fluid. The improvement in suspension inhibits the formation of scale, or paraffin or corrosion in associated piping.

BRIEF DESCRIPTION OF THE FIGURES

Figure One is an external view of the preferred hydrocarbon unit.

Figure Two is an alternate of the preferred hydrocarbon unit.

Figure 2:
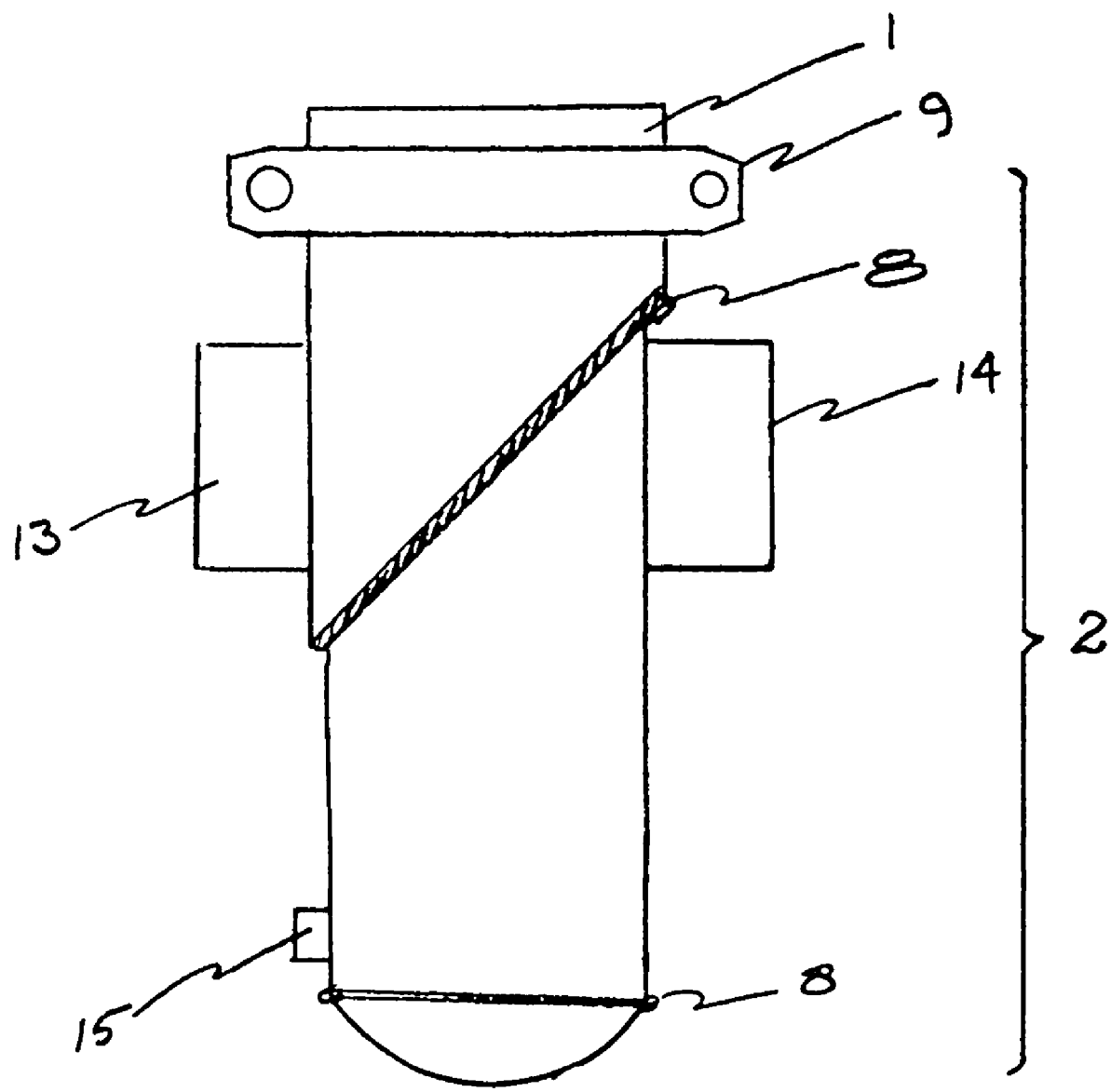

Figure Three is a cut away of FIG. 2, and serves to illustrate the internal mating lip employed within the unit.

Figure Four is a further alternate for the unit using a threaded lid.

Figure Five is a conceptual cut away drawing of the unit—an exploded schematic.

Figure Six is an external view of the plastic version of the unit used for water and non-flammable liquids.

Figure Seven shows the alloy plate.

Figure Eight gives the construction details for the preferred hydrocarbon unit.

Figure 6:
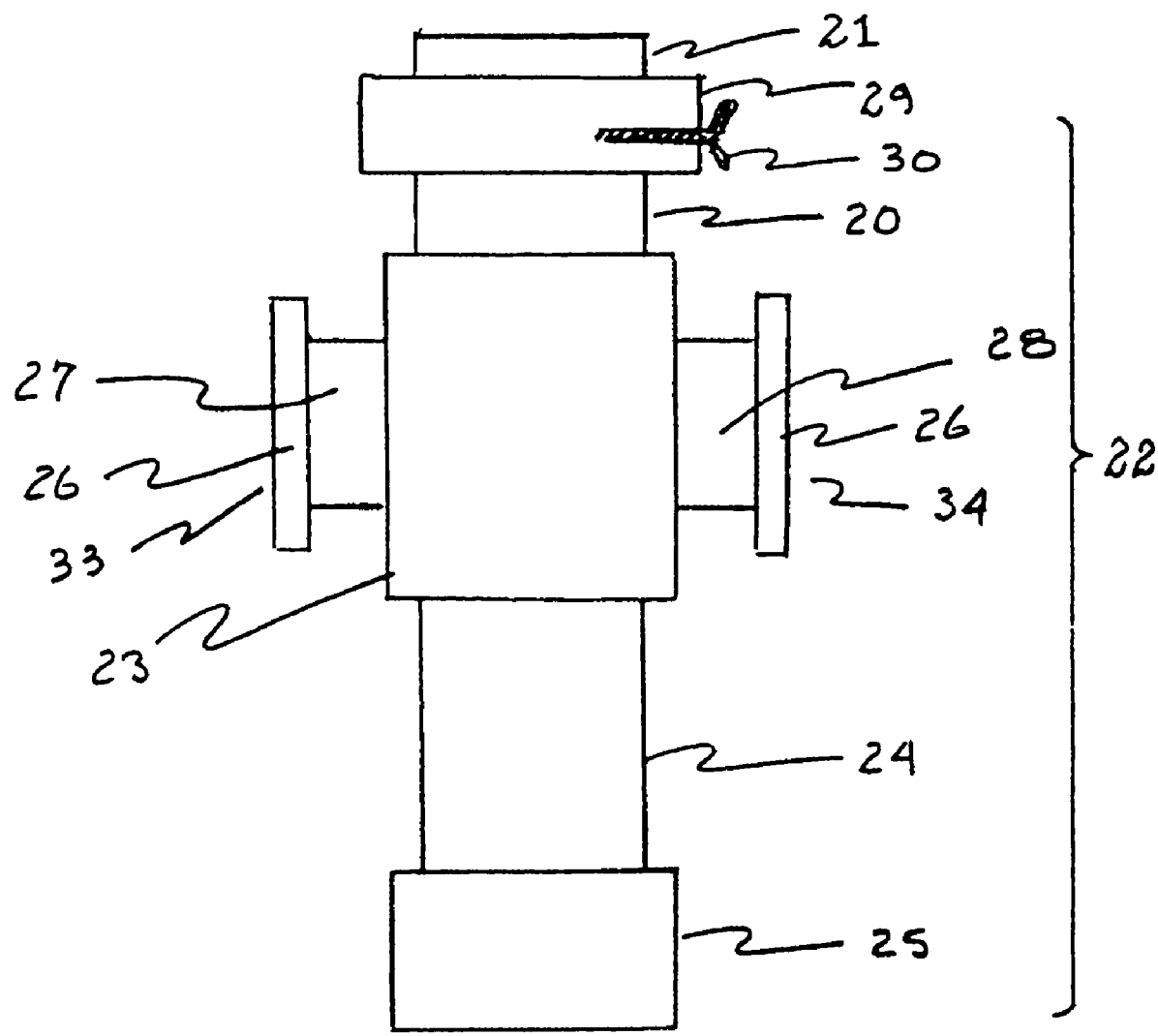

Figure Nine shows the internal construction detail for the plastic unit of FIG. 6.

Figure Ten is a process diagram showing how the unit would be employed in a re-circulating process.

DESCRIPTION OF THE PREFERRED DEVICE

Figure 1:
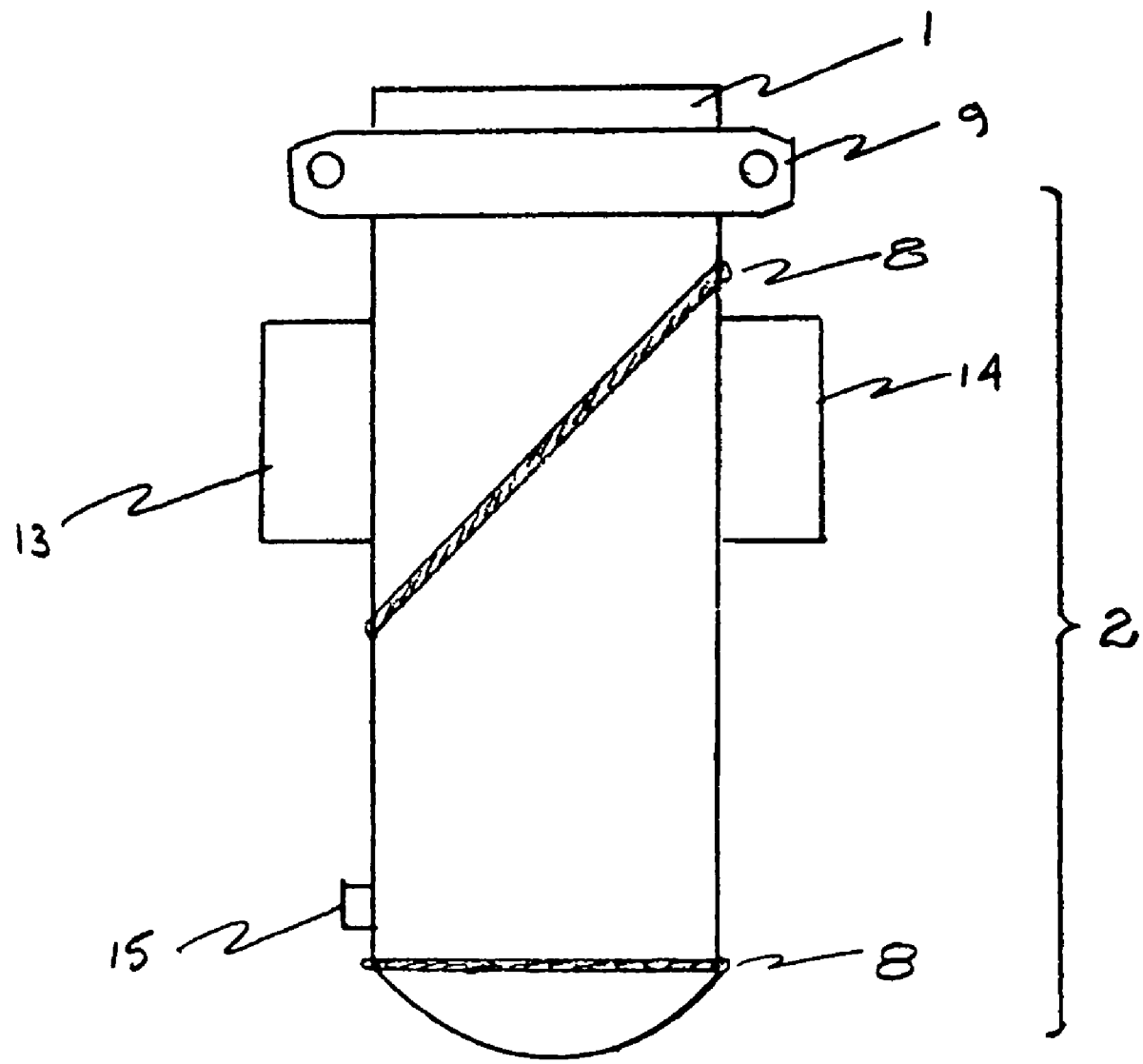
Figure 3:
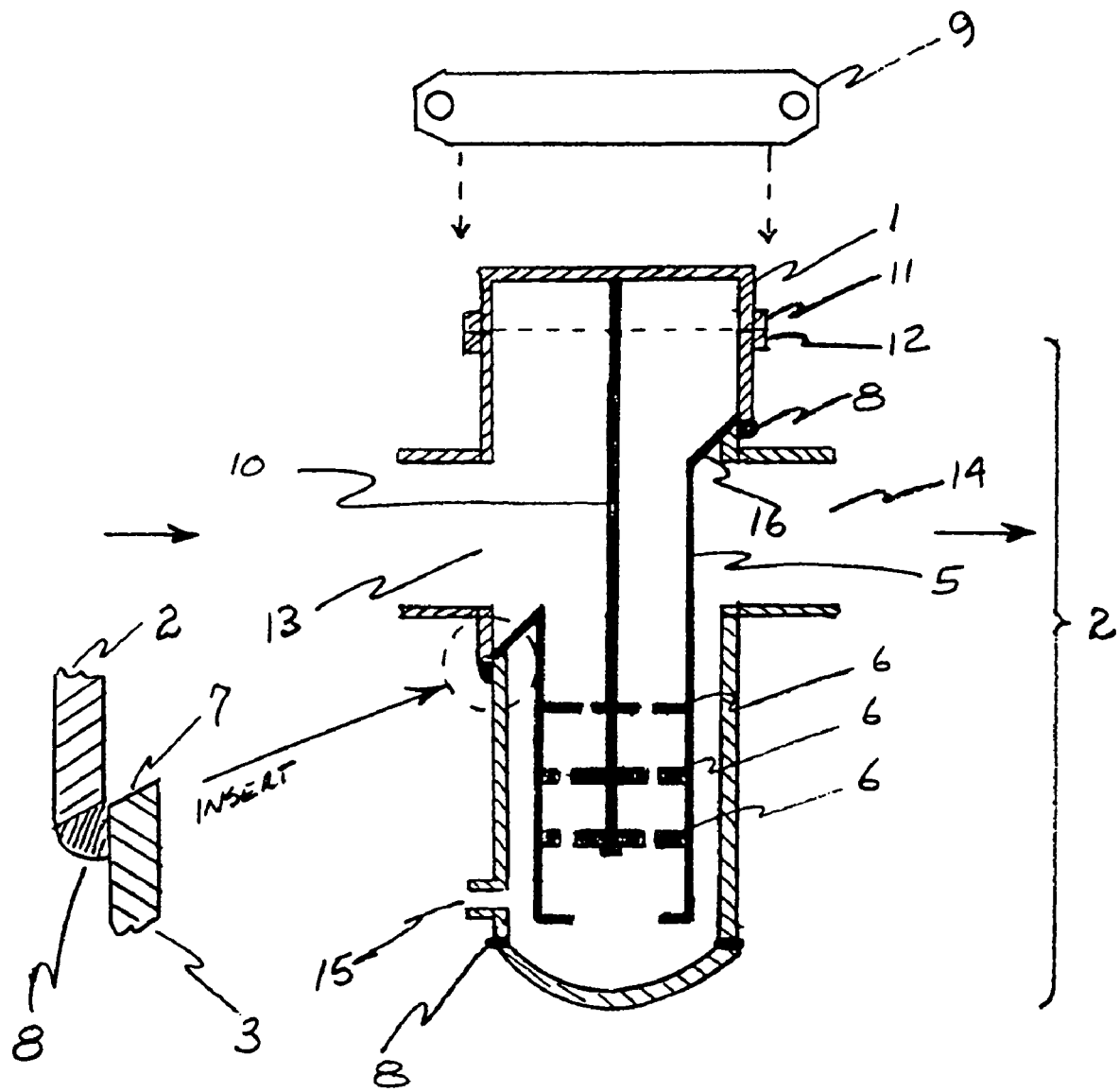
Figure 4:
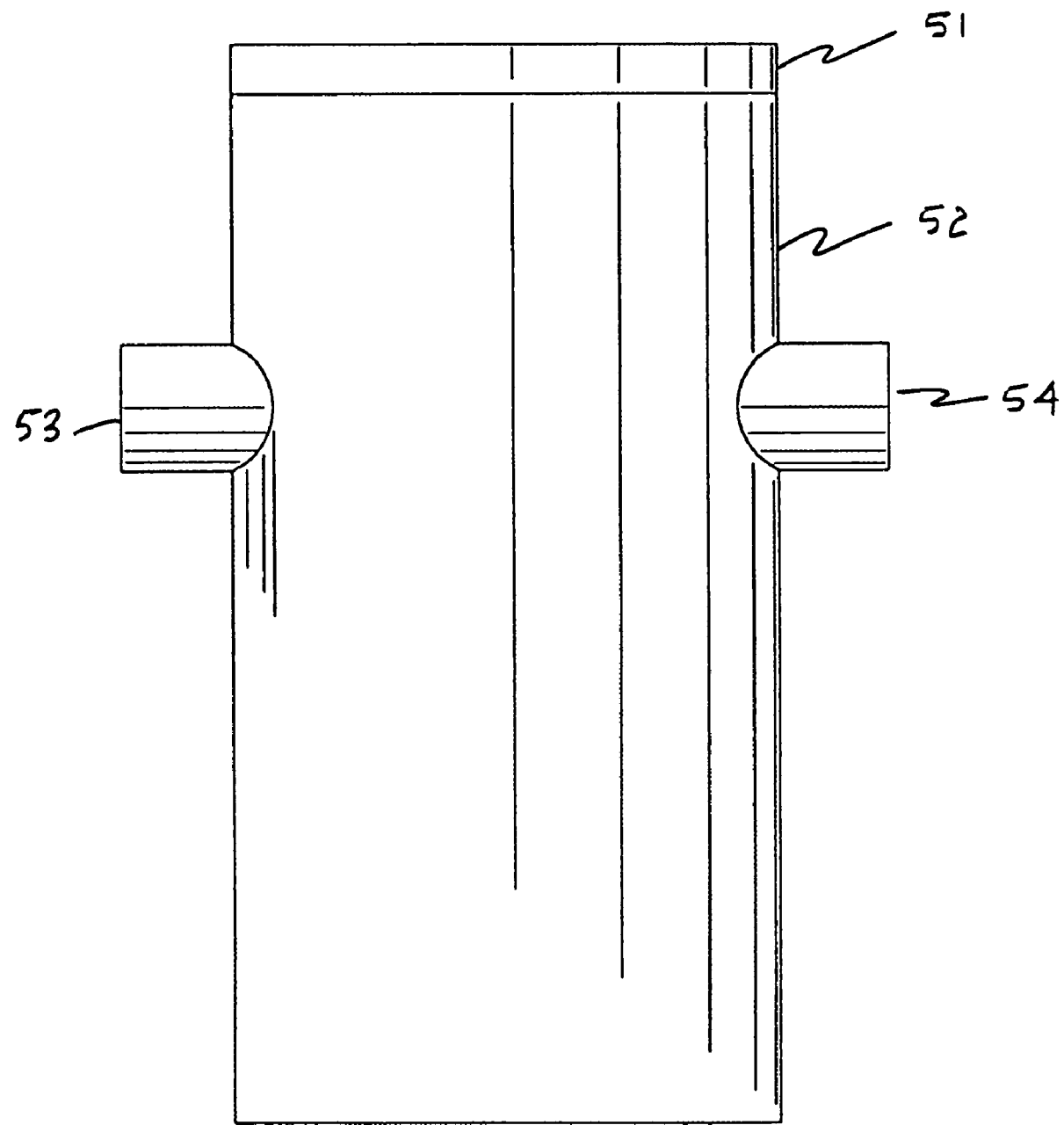

The instant device is designed to increase the fluid contact with an alloy and be readily maintainable: several embodiments are available to fit specific purposes and applications. FIGS. 1 through 3 show a hydrocarbon surface embodiment; whereas; FIG. 2 shows a water surface embodiment. Both embodiments are similar, but for the materials of construction of the container, and use a clamp to hold the lid in place. The device shown in FIGS. 4 and 5 may take either the water embodiment or the hydrocarbon embodiment and use a lid that screws into the container.

The hydrocarbon unit must use metal as the filter case; whereas, the water unit may use a plastic case. It is possible to use plastic in a hydrocarbon application, but it is not recommended. All embodiments of the units are basically two part devices when viewed from the outside. I.e., a container and an associated lid. A basket and insert fit within the container and access to the basket and insert is made possible via the readily removable lid.

As can be seen in the Figures, the lid, 51, 21 or 1, is readily parted from the container, 52, 22 or 2, thereby allowing for easy service of the alloy basket. Two embodiments are used. The first is a screw lid, 51, where the lid screws into the container body, 52, and the second uses a clamp band, 29 or 9 around a preformed lip known as a DRESSER fitting or DRESSER coupling to clamp the lid, 21 or 1, to the container, 22 or 2.

Fluid enters the inlet port, 53, 33 or 13 where it is forced to make a sharp 90-degree turn and move downward through the insert or turbulence generator, 10, the basket, 5, and out of the bottom of the basket, 5. A further sharp 180-degree follows at the bottom of the basket, 5. The fluid then flows back the to top and makes a further 90-degree turn to exit the device through the outlet port, 54, 34 or 14. Thus, the insert and basket assembly (the combination of the basket and insert) cause the flowing fluid to follow a convoluted path and induce the required turbulence.

Experimentation has shown that when fluid contact between the alloy and the fluid is maximized scale and buildup in downstream piping, or downstream conduit, is substantially reduced. Therefore the inventors have devised the best circuitous or convoluted path possible, while devising a readily maintained and easily manufactured device. Hence the dramatic change in fluid direction with the resulting highly turbulent flow through the basket.

Figure 5:
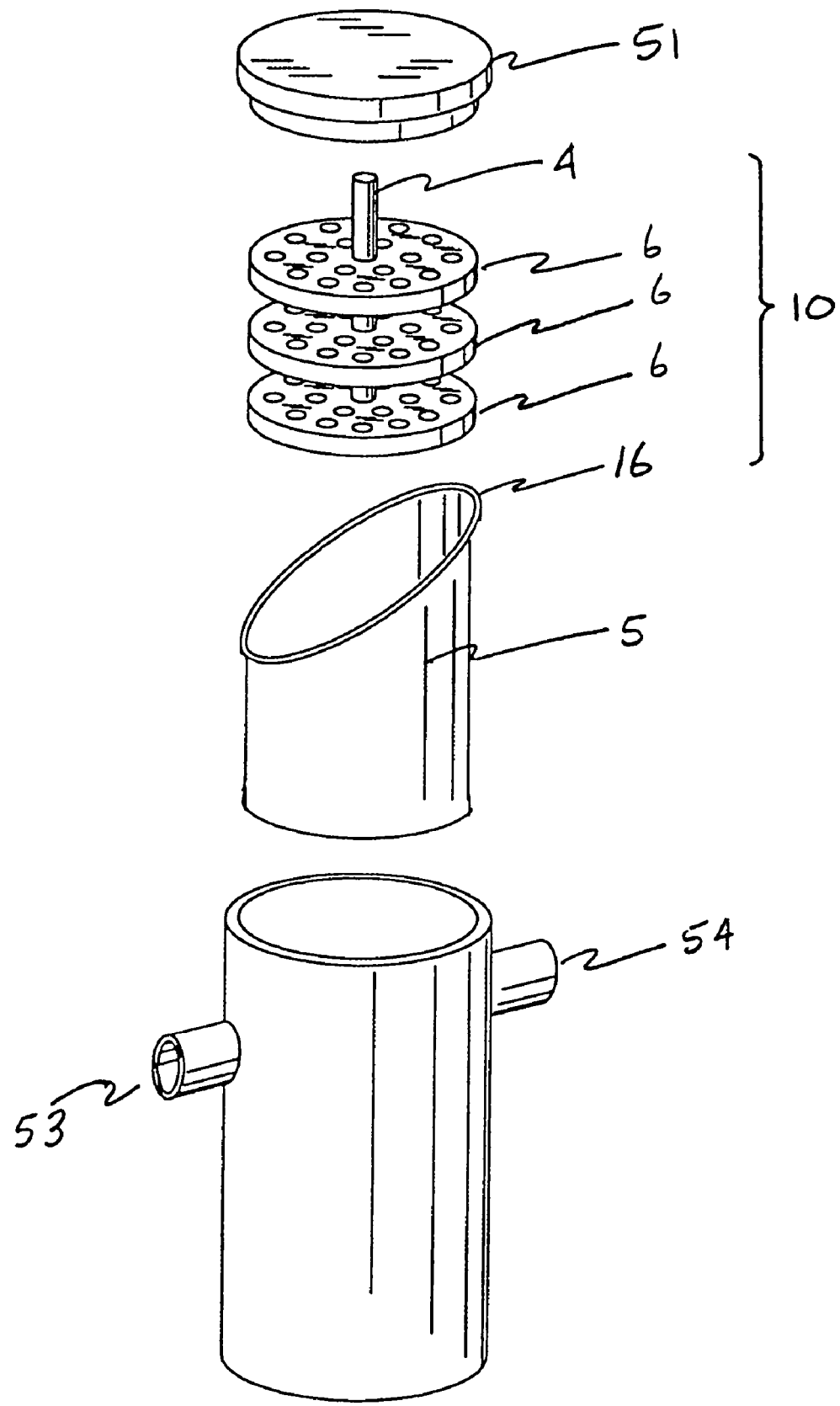
Figure 7:
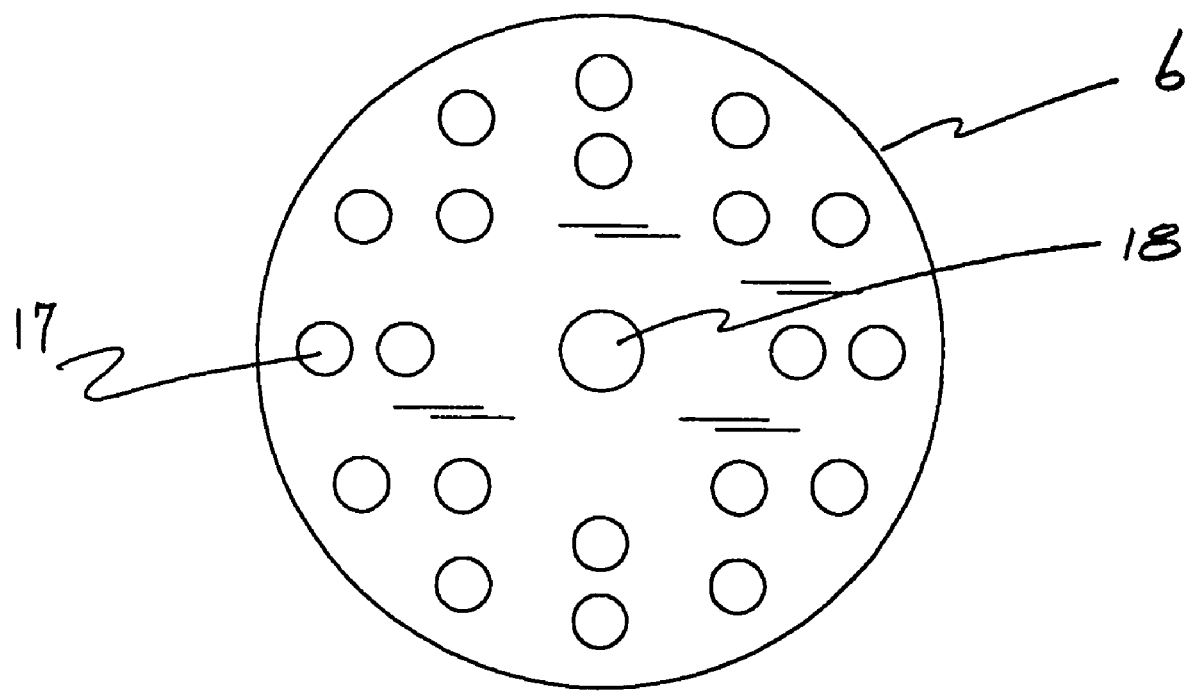

Fluid contact is further enhanced, as shown in FIGS. 3, 5 and 7, by providing a turbulence generator, 10, that is made up of a plurality of insert plates, 6, with a plurality of fluid apertures, 17. The size of the device, quite simply put is determined by the fluid flow. That is, the greater the fluid flow, the larger the container (and lid), the larger the basket, 5, the larger the insert, 10, the greater the number of plates, 6, in the insert. To further increase alloy to fluid contact the shaft, 4, holding and/or separating the insert plates and the basket, 5, may be manufactured from the alloy.

The preferred alloy is the standard Walker alloy (see U.S. Pat. No. 4,789,031), which is cast into appropriate sized plates for the required insert plates, 6. The Walker alloy comprises copper between 40–66%, zinc between 2–28%, nickel between 5–25%, lead between 2–15%, tin between 1–5% and traces of Iron, Antimony, Sulphur and Manganese. Remember that the size of the plates, 6, and associated fluid apertures, 17, the actual insert or turbulence generator, 10, and basket, 5 would be set by the expected flow rate through the device. As stated the alloy plates are cast into the circular shape shown in FIG. 7

In a similar manner the Walker alloy is formed into sheets that are used to form the basket, 5. The Walker Alloy can be welded using suitable welding rods, and the basket is manufactured by rolling and welding a seam, along with the bottom (see FIGS. 3 and 5) and the angled top and lip, 16.

The basket lip, 16 lies along a corresponding ledge formed within the container, 7 or 31. The lip, 16 and ledge, 7, fit tightly very together. As shown in the Figures, the ledge, 7 or 31 lies along the inside circumference of the container starting at the low side of the inlet port and extending to the high side of the outlet port. The basket lip is circumferentially formed about the top side of the basket. The central rod or shaft, 4, of the insert, 10, (see FIGS. 3 and) fits against the lid, 51, 21 or 1, when the lid is placed on the container, 52, 22 or 2. As the lid is clamped or screwed in place, the insert presses against the bottom of the basket, forcing the basket lip against the container ledge. Some leakage around the lip/ledge interface will occur but will be minimal. This leakage is not critical as the leaking fluid still comes in contact with the alloy—the key again is contact area with the alloy. The key to this seal is to force the flowing fluid to follow the convoluted path between the inlet and outlet ports.

Figure 8:
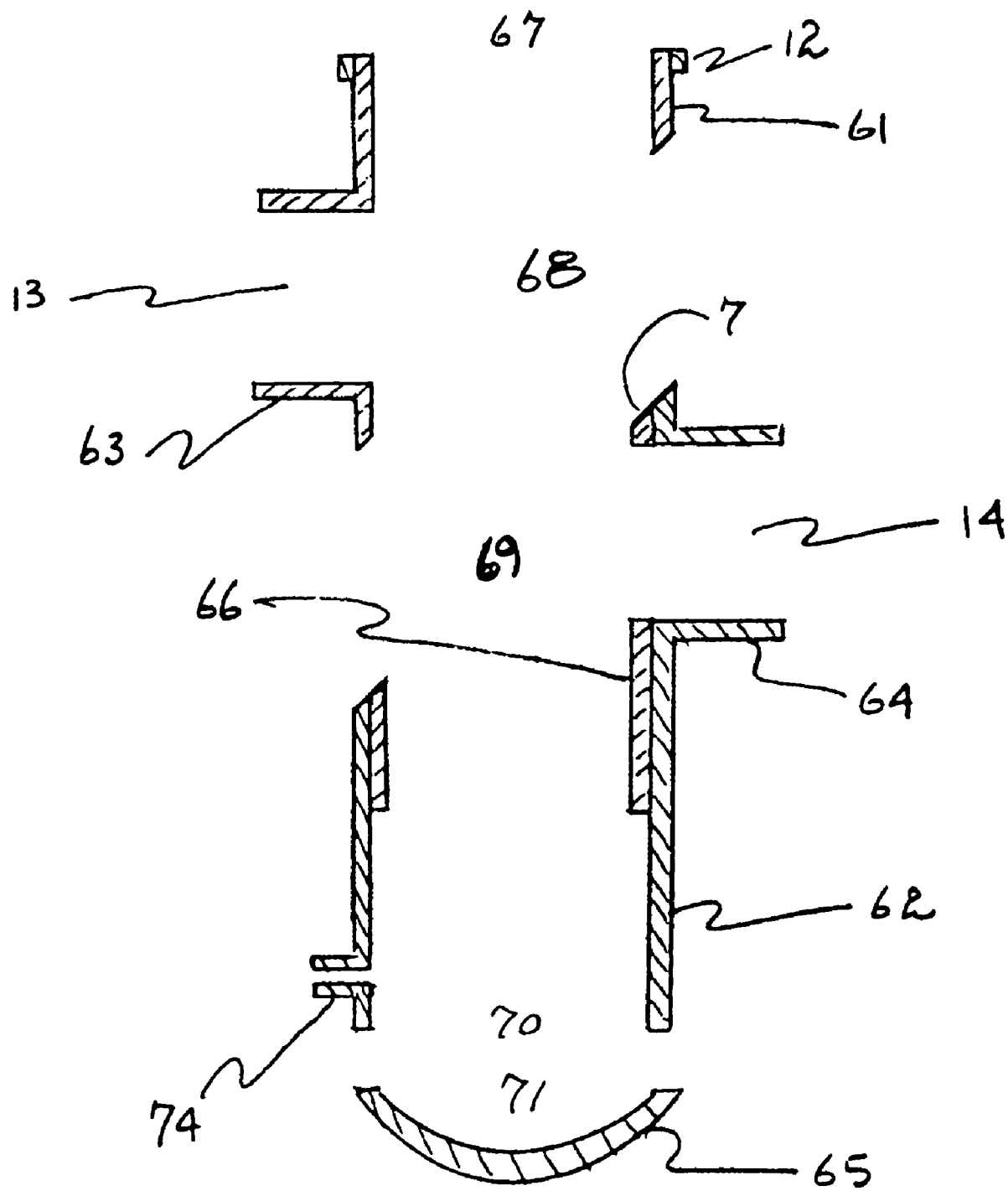

The hydrocarbon embodiment is manufactured from steel and is best followed by looking at FIGS. 1 and 8. The lower container, 2, is formed from six basic parts. The upper section, 61, which is essentially a piece of steel pipe (of the correct grade and rating to meet the required service) with one square cut end, 67, and one angle cut end, 68. A coupling ring, 12, is welded or formed about the top end or square cut end, 67, if the DRESSER coupling or clamp, 9, is to be used for hold the lid, 1, in place. The coupling ring is NOT used for the screw lid, but rather a set of threads is machined into the inside surface of the upper end of the upper section.

The middle section, 62, which is essentially a piece of steel pipe (of the correct grade and rating to meet the required service) with one angle cut end, 69, and one square cut end, 70 at the bottom. A beveled-ring, 66, is formed or welded on the inside of the middle section so that the bevel aligns exactly with the angle cut (or upper) end of the middle section, 62. (An alternate embodiment may place the bevel slightly above or slightly below the upper end. This is a simple manufacturing choice. If the bevel is slightly higher than the upper end, then, during manufacture, alignment of the upper section with the middle section would be facilitated.) The bevel ring forms the ledge, 7, upon which the basket lip, 16, rests or seals against as described earlier.

The upper section and middle section are joined by welding (or other suitable process) by a weld bead, 72. Two weldalets, 63 and 64, forming the inlet, 13, and outlet ports, 14, are welded onto the assembly over the appropriate opening. An end cap, 65, is joined by welding (or other suitable process) by a weld bead, 73. A third weldalet, 74, may be placed, over a suitable opening, on the device to form the optional drain port, 15.

The lid, 51 or 1 will take one of two forms. If the DRESSER coupling is to be used to connect the lid, 1, to the container then a ring, 11, is welded to the lid, 1, which is manufactured from suitable steel. It should be noted that there are some DRESSER couplings that are designed to hold a circular plate over the end of a steel pipe; therefore, it may not be necessary to add the ring, 11, to the lid. (See FIGS. 3 and 5.)

An alternate way to manufacture the hydrocarbon (steel) device is shown in FIGS. 1 and 3. In this case the upper section is cut as described above as is the middle section. However, the middle section is cut from pipe that has an outside diameter (OD) that just fits within the inside of the upper section. This means that the face of the inclined end of the middle section becomes the ledge, 7. The two parts are joined by welding.

Figure 9:
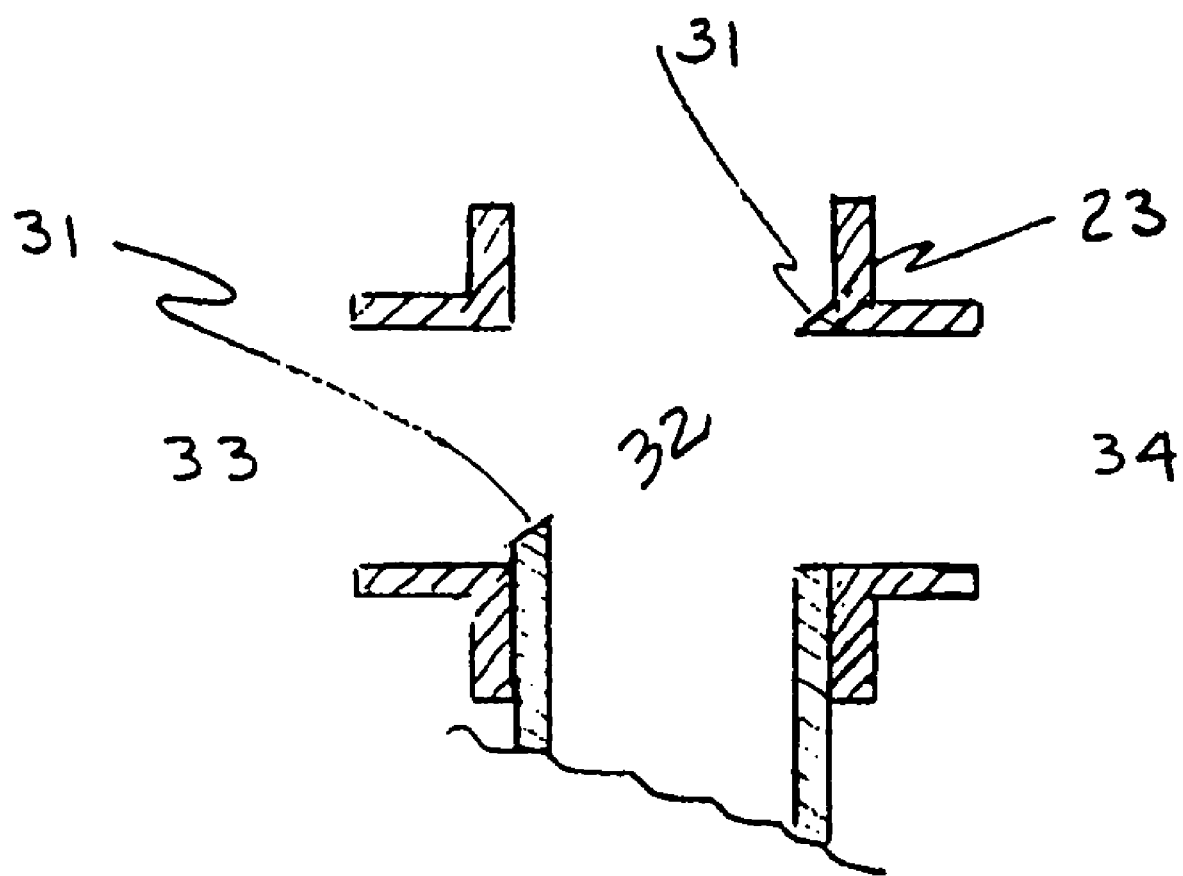

The plastic embodiment shown in FIG. 2 is fairly simple to manufacture and consisted of joining readily available plastic parts together with a suitable solvent or glue. A standard plastic cross-section, 23, is modified before the container is assembled. The modification consists of forming a ledge, 31, (shown in FIG. 9 and equivalent to the ledge, 7, shown in FIG. 8 and described above) within the cross-section. This ledge may formed by milling out material or gluing a bevel ring inside the cross-section (equivalent to the bevel ring, 66, shown in FIG. 8 and described above). In fact, the middle piece of pipe, 24, may be cut to have an inclined end thereby forming the required ledge, 31. It should be noted that the illustration in FIG. 9 has been distorted on the inlet port side to raise the ledge above the inlet port: under normal circumstances this should not be done.

Two pieces of suitable strength (grade) plastic pipe are cut to form the upper piece, 20, and the middle piece, 24. These pieces are glued into a cross-section, 23. Two further pieces of plastic pipe, 27 and 28, are glued into the cross-section and a suitable flange, 26, is attached to the cross ends forming the inlet and outlet ports. Finally an end connector, 25, is glued to the remaining opening on the lower piece, 24. The lid, 21, is held in place with a standard stainless steel clamp, 29, which is drawn closed by wing nut and thread, 30.

The ledge may be formed by using a different ID pipe for the lower piece, 28. As described for the alternate form of the hydrocarbon embodiment, the lower piece would have one square end (the end that joins onto the end connector, 25) and one inclined end. The lower piece would be glued within the cross-section (similar to FIG. 3) so that the surface of the inclined end forms the required ledge, 7. This is a manufacturing choice.

The turbulence generator or insert, 10, is manufactured from cast alloy plates, 6. (preferable the Walker alloy) as shown in FIG. 7. The plates are circular and sized to fit within the basket, 5, as shown in FIGS. 3 and 5. A plurality of fluid apertures, 17, are drilled through the plate and a further connection aperture, 18, is drilled through the center. The fluid apertures may be drilled in a random pattern. The plates are joined by a shaft, 4, that maintains the separation and position of the plates and which passes through the connection aperture 18.

As stated earlier, the basket, 5, that acts to change the direction of fluid flow by some 360 degrees is formed by welding sheet metal into a circular shape with its upper end cut at an incline (matching the incline of the container) and having a lip, 16. The basket may be formed stainless steel or other suitable metal or alloy. It is preferred that the basket be formed from the Walker alloy as previously explained.

The device (be it the hydrocarbon embodiment or water—non flammable fluids—embodiment) is connected to a piping system using standard techniques. It is recommended that two devices be installed in parallel with the necessary valving so that one device may be taken of-of-service for maintenance leaving the other in service. Such piping arrangement are well known in the industry. In hydrocarbon production the device should be installed as near the wellhead as practically possible and would use the wellhead pressure as the prime mover of the fluid through the device and into the piping to be protected (the gathering system). In water service the device should be installed as near the source (pump) as possible.

Figure 10:
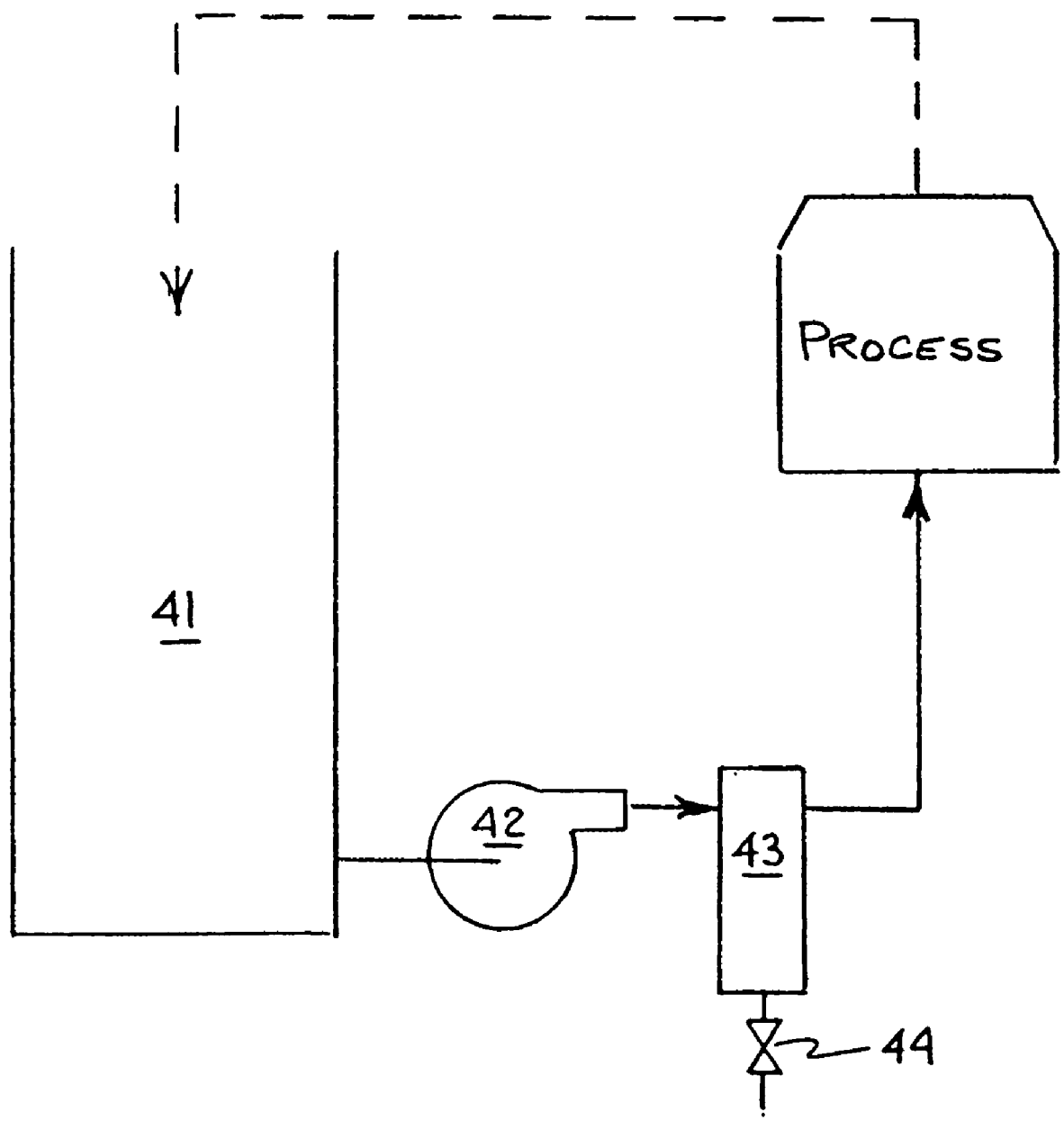

FIG. 10 illustrates a method of use for the device in re-circulating water service, such as water cooling. The process starts at the holding tank, 41. Liquid is drawn from the tank and passes through a prime mover (pump), 42. From the pump the liquid passes through the device, 43 (shown with an optional drain and valve, 44). From the device the fluid passes onto the process (the heat exchangers and cooling towers). In a continuous process, two surface units connected in parallel should be employed. Standard valving should be employed so that one unit may be taken out of service for maintenance (basket cleaning) while the other unit remains in service.

This technique can be modified for use in water injection systems in the oil industry. In this situation, water would be drawn from the source, through the pump, and the device on onto the water purification process for injection into a well.

As described above, the fluid passes first through the pump: this is not a necessary requirement. If the position of the device and pump were reversed the pump would be protected from corrosion and build-up. This may not be practical due to the pressure drop in the device, but the preferred method should not be construed as a limitation.

The concept of the basket and insert may readily be extended to in-line devices utilizing the insert with the segments rotated in order to increase turbulence.

As stated, the device may be installed readily in the flow lines of a well, and when properly installed and maintained will reduce paraffin, scale and corrosion effects in surface piping. Initial confidential testing showed that scale and corrosion were significantly reduced. One operator reports that before the installation of the test device, operator flow hot oil through surface flow lines to clear out paraffin buildup every thirty days. Forty-five days after its test installation no paraffin was found in the gathering lines. The use of corrosion inhibitor chemicals was reduced to zero.

Confidential tests were conducted on a salt-water injection facility, which was experiencing severe calcium carbonate buildup. The facility used four gallons of inhibitor per day prior to the test. It was also noted that backpressure on the well ranged between 425 and 430 psi with the inlet transfer line pressure at 70 psi. The device was installed and chemical injection stopped. Seventy-one days later the system was opened for inspection. No additional buildup (over what was present at the start of the test) was found. Well injection pressure averaged 410 psi (an improvement) along with a reduction of transfer line pressure to 50 psi. The operator noted that the device required ONE cleaning during the 71-day period.

The choices of size of fluid apertures, diameter of the container, the size of the basket, the number of plates and the diameter of same all fall within standard engineering practice. Therefore is believed that there has been disclosed the preferred and most mode embodiments of the device and methods of using the device in fluid service. Several methods of manufacture have been described. The device is designed to have a readily removable basket and insert and variations, such as the use of a seal between the lip of the basket, 16, and the ledge, 7. An alternate would be to place a seal between the basket, 5, and the inside of the container. Finally, as stated earlier, the seal may be omitted. All of these alternates are within the scope of the disclosure. It should be apparent that the best angle for the incline is 45-degrees because the device is forcing a 360-degree in fluid direction as fluid passes through it.

ITEM LIST

This list is provided as an aid to examination and may be incorporated into the disclosure at the will of the Examiner.
1 Lid
2 Container
3
4 Connection Shaft
5 Basket
6 Plate
7 Ledge
8 Weld
9 DRESSER Clamp
10 Insert or Turbulence Generator
11 Lid (DRESSER) Coupling Ring
12 Container (DRESSER) Coupling Ring
13 Inlet Port
14 Outlet Port
15 Drain
16 Basket Lip
17 Fluid Apertures
18 Connection Aperture
19
20 Upper Piece
21 (Plastic) Lid
22 (Plastic) Container
23 Cross-Section
24 Middle Piece
25 End Connector
26 Flange
27 Inlet Pipe
28 Outlet Pipe
29 Clamp
30 Wing Nut and Thread
31 Ledge
32 Inclined End
33 Inlet Port
34 Outlet Port
35
40
41 Holding Tank or Source
42 Pump
43 The device
44 Drain and valve
45
50
51 Lid
52 Container
53 Inlet Port
54 Outlet Port
55
60
61 Upper Section
62 Middle Section
63 Inlet Weldalet
64 Outlet Weldalet
65 End Cap
66 Beveled-Ring
67 Upper Section square cut or top end
68 Upper angle cut end
69 Middle Section angle cut end
70 Middle section square cut or bottom end
71 End cap top
72 Inclined weld
73 End cap weld
74 Drain Weldalet
75

We claim:

1. A fluid conditioner adapted for connection to fluid conduits for receiving and modifying flowing fluids thereby suspending solid materials and inhibiting the formation of precipitates within the fluid conduit downstream of the fluid conditioner comprising:
   a circular container, having a top, an inside and an outside and further having an inside circumference within said inside thereof and an outside circumference on said outside thereof;
   a lid adapted to be received by said container attached to said top of said container;
   an inlet port having a low side affixed to said container and in communication with said inside of said container;

an outlet port having a high side affixed to said container and in communication with said inside of said container;
    wherein said inlet port and said outlet port are located opposite each other on said outside circumference of said container near said top of said container;
an angled ledge formed within said inside of said container extending about said inside circumference of said container between said low side of said inlet port to said high side of said outlet port;
a basket having a top and an inside placed within said inside of said container
an angled lip formed circumferentially about said top of said basket
    wherein said angled lip fits against said angled ledge thereby forming a seal between said basket and said inside of said container, and;
an insert, manufactured from a metal alloy capable of modifying the flowing fluid, placed within said inside of said basket comprising
    a plurality of plates having a plurality of fluid apertures bored through said plates; and,
    a connection shaft connecting between said plurality of plates said connection shaft capable of affixing each of said plurality of plates in a parallel relationship one to the other
        whereby said basket and said insert cause the flowing fluid passing through the fluid conditioner from said inlet port of said container to said outlet port of said container to follow a convoluted flow path while said insert modifies the flowing fluid thereby suspending solid materials and inhibiting the formation of precipitates.

2. The fluid container of claim 1 wherein said basket is manufactured from a metal alloy capable of modifying the flowing fluid.

3. The fluid container of claim 2 wherein said metal alloy comprises:
    Copper between 40–66 per cent;
    Zinc between 2–28 per cent;
    Nickel between 5–25 per cent;
    Lead between 2–15 per cent;
    Tin between 1–5 per cent;
    and traces of Iron, Antimony, Sulphur and Manganese.

4. The fluid container of claim 1 wherein said metal alloy comprises:
    Copper between 40–66 per cent;
    Zinc between 2–28 per cent;
    Nickel between 5–25 per cent;
    Lead between 2–15 per cent;
    Tin between 1–5 per cent;
    and traces of Iron, Antimony, Sulphur and Manganese.

5. A fluid conditioner adapted for connection to fluid conduits for receiving and modifying flowing fluids thereby suspending solid materials and inhibiting the formation of precipitates within the fluid conduit downstream of the fluid conditioner comprising:
    a circular container, having a top, an inside and an outside and and further having an inside circumference within said inside thereof and an outside circumference on said outside thereof;
    a lid adapted to be received by said container attached to said top of said container;
    an inlet port, having a low side, affixed to said container and in communication with said inside of said container;
    an outlet port, having a high side, affixed to said container and in communication with said inside of said container;
        wherein said inlet port and said outlet port are located opposite each other on said outside circumference of said container near said top of said container;
    a basket having a top, placed within said inside of said container;
    an angled ledge formed within said inside of said container extending about said inside circumference of said container between said low side of said inlet port to said high side of said outlet port;
    an angled lip formed circumferentially about said top of said basket
    wherein said angled lip fits against said angled ledge thereby forming a seal between said basket and said inside of said container;
    an insert placed within said inside of said basket comprising
        a plurality of plates having a plurality of fluid apertures bored through said plates; and,
        a connection shaft connecting between said plurality of plates said connection shaft capable of affixing each of said plurality of plates in a parallel relationship one to the other;
    wherein said basket and said insert are both manufactured from an alloy comprising:
        Copper between 40–66 per cent;
        Zinc between 2–28 per cent;
        Nickel between 5–25 per cent;
        Lead between 2–15 per cent;
        Tin between 1–5 per cent;
        and traces of Iron, Antimony, Sulphur and Manganese
    wherein said basket and said insert cause the flowing fluid passing through the fluid conditioner from said inlet port of said container to said outlet port of said container to follow a convoluted flow path while at the same time modifying the flowing fluid thereby suspending solid materials and inhibiting the formation of precipitates.

* * * * *